(12) United States Patent
Ruan

(10) Patent No.: US 12,336,506 B1
(45) Date of Patent: Jun. 24, 2025

(54) CAT TOY

(71) Applicant: Mengfan Ruan, Jiangxi (CN)

(72) Inventor: Mengfan Ruan, Jiangxi (CN)

( * ) Notice: Subject to any disclaimer, the term of this patent is extended or adjusted under 35 U.S.C. 154(b) by 0 days.

(21) Appl. No.: 19/083,969

(22) Filed: Mar. 19, 2025

(51) Int. Cl.
*A01K 15/02* (2006.01)

(52) U.S. Cl.
CPC .................................. *A01K 15/025* (2013.01)

(58) Field of Classification Search
CPC .... A01K 15/025; A01K 15/02; A01K 15/027; A01K 15/021
See application file for complete search history.

(56) References Cited

U.S. PATENT DOCUMENTS

| | | | | |
|---|---|---|---|---|
| 4,930,448 A * | 6/1990 | Robinson | ............. | A01K 15/025 119/708 |
| 5,657,721 A * | 8/1997 | Mayfield | ............. | A01K 15/025 446/175 |
| 5,675,225 A * | 10/1997 | Moore | ................. | A01K 15/025 318/257 |
| 2010/0236496 A1 * | 9/2010 | Comerford | ........... | A01K 15/025 119/707 |
| 2012/0234258 A1 * | 9/2012 | Cook | ................... | A01K 15/025 119/708 |
| 2015/0201584 A1 * | 7/2015 | Crane | ................. | A01K 15/025 119/707 |
| 2015/0359194 A1 * | 12/2015 | Coopman | ............ | A01K 15/025 119/706 |
| 2022/0408695 A1 * | 12/2022 | Hartelius | ............. | A01K 15/021 |
| 2024/0306606 A1 * | 9/2024 | Salyer | ................. | A01K 15/025 |

\* cited by examiner

*Primary Examiner* — Trinh T Nguyen
(74) *Attorney, Agent, or Firm* — Nicholas Makridakis

(57) ABSTRACT

The present disclosure provides a cat toy, including an upper shell and a lower shell. A rotating disk is arranged between the upper shell and the lower shell, and the edge of the rotating disk is connected with a rotating rod. A suction cup is connected below the lower shell, and a first cover cloth is arranged between the suction cup and the lower shell. A rotating head is connected above the upper shell, and a second cover cloth is arranged between the rotating head and the upper shell. A connecting part is arranged at the edges of the first cover cloth and the second cover cloth, and the rotating rod extends between the first cover cloth and the second cover cloth. This application uses a double-layer design for the cover cloths, and the rotating rod can smooth out folded cover cloths when rotating.

15 Claims, 5 Drawing Sheets

CAT TOY

TECHNICAL FIELD

The present disclosure relates to the field of toys, and specifically relates to a cat toy.

BACKGROUND

With the improvement of people's living standards, more and more families choose to keep cats as pets. At present, various types of cat toys are available on the market. The existing cat sticks are mainly waved to simulate the movement of prey and attract cats to chase, to exercise the reaction ability of the cats. However, the existing cat sticks are likely to be dragged away by pets during use, and a cover cloth is prone to folding up, cannot be returned to the original position thereof, and is likely to fall off. The existing cat toys have a single function, have not taken into account the unevenness of fabrics such as cover cloths caused by cats during play, and cannot achieve the function of smoothing out the cover cloths either. After the cats play with the cat toys, pet owners often need to spend extra time and energy smoothing out the cover cloths, which brings inconvenience to the daily lives of the pet owners.

SUMMARY

The objective of the present disclosure is to provide a cat toy to solve the above-mentioned problems.

The present disclosure achieves the above objective by the following technical solutions:

A cat toy, including an upper shell and a lower shell, where a rotating disk is arranged between the upper shell and the lower shell, and the edge of the rotating disk is connected with a rotating rod;

a suction cup is connected below the lower shell, and a first cover cloth is arranged between the suction cup and the lower shell;

a rotating head is connected above the upper shell, and a second cover cloth is arranged between the rotating head and the upper shell;

a connecting part is arranged at the edges of the first cover cloth and the second cover cloth, and the rotating rod extends between the first cover cloth and the second cover cloth; and a driving component for driving the rotating disk to rotate is arranged in a space formed by the upper shell and the lower shell being connected.

Preferably, a plurality of notches are formed on the surface of the first cover cloth, the end of the rotating rod is connected with a decorative object, and when the rotating rod rotates, the rotating rod drives the decorative object to rotate and continuously appear at the plurality of notches in the first cover cloth.

Preferably, a connecting rod is arranged at the edge of the rotating disk, and the rotating rod is clamped with the connecting rod.

Preferably, the end of the rotating rod is detachably connected with a rod head.

Preferably, the rod head is in detachable threaded connection with the rotating rod.

Preferably, the driving component includes a motor, the motor drives a first gear via a transmission mechanism, internal teeth are formed on the inner wall of the rotating disk, and the first gear meshes with the internal teeth.

Preferably, a plurality of gears are arranged along the inner wall of the rotating disk, and the gears are uniformly distributed along the circumference of the rotating disk.

Preferably, a second gear and a third gear meshing with the internal teeth are also arranged along the inner wall of the rotating disk, and the first gear, the second gear and the third gear are uniformly distributed along the internal teeth of the rotating disk.

Preferably, the first gear, the second gear and the third gear all use capped pins as shafts and are connected with the lower shell.

Preferably, the transmission mechanism includes a first belt pulley, a second belt pulley, a third belt pulley and a fourth belt pulley, the first belt pulley is connected with the second belt pulley via a first transmission belt, and the third belt pulley is connected with the fourth belt pulley via a second transmission belt; and the third belt pulley is arranged below the second belt pulley and integrally formed with the second belt pulley, and the fourth belt pulley is arranged below the first gear and integrally formed with the first gear.

Preferably, the diameter of the first belt pulley is smaller than that of the second belt pulley, and the diameter of the third belt pulley is smaller than those of the second belt pulley and the fourth belt pulley.

Preferably, a fishing rod component is connected above the rotating head.

Preferably, the fishing rod component is in threaded connection with the rotating head.

Preferably, a connecting rod of the suction cup penetrates through the lower shell and the upper shell and is in threaded connection with the rotating head.

Preferably, a battery and a control circuit board are also arranged in the space formed by the upper shell and the lower shell being connected, and the control circuit board is electrically connected with the motor.

Beneficial effects: This application uses a double-layer design for the cover cloths, and the rotating rod can smooth out folded cover cloths when rotating. The upper and lower double cover cloths are fixed together to prevent the cover cloths from falling off. Moreover, the head of the rotating rod is connected with the decorative object, and the head is detachably connected with the rotating rod. When the decorative object is damaged, the decorative object can be replaced directly without replacing the entire rod.

BRIEF DESCRIPTION OF FIGURES

To describe the technical solutions in embodiments of the present disclosure or in related art more clearly, accompanying drawings required for describing the embodiments or related art are briefly described below. Apparently, the accompanying drawings in the following description show some embodiments of the present disclosure, and a person of ordinary skill in the art may still derive other drawings from these accompanying drawings without creative efforts.

Figure 1:
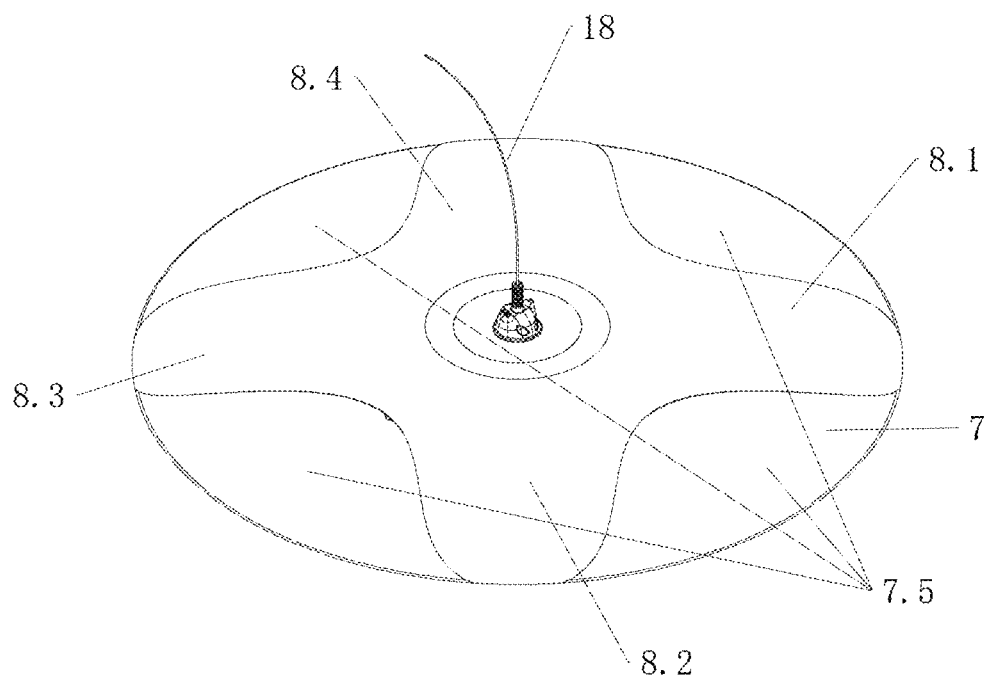
FIG. 1 is a top stereoscopic view of the present disclosure.
Figure 2:
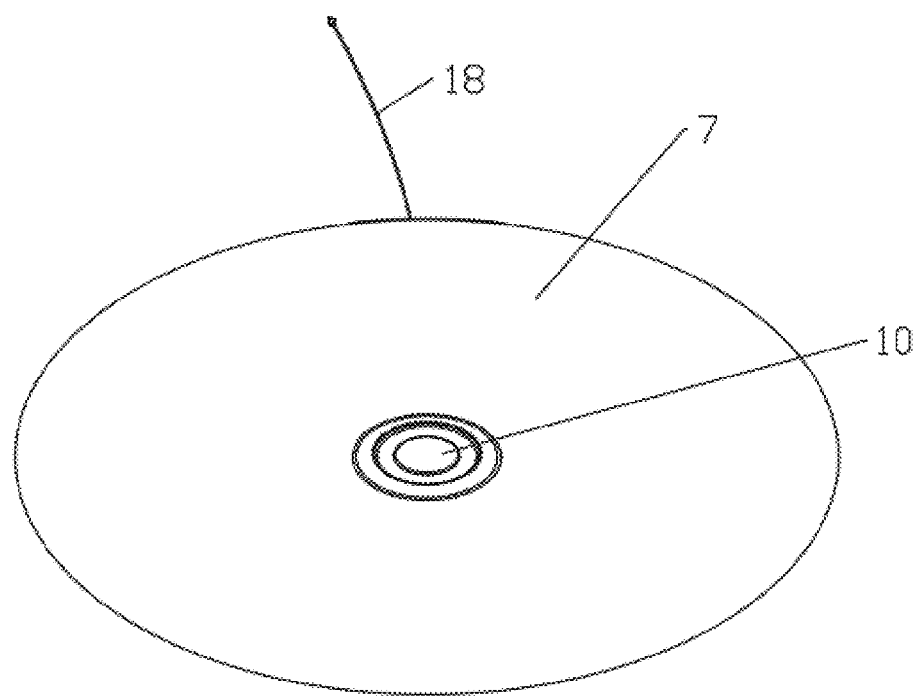
FIG. 2 is a bottom stereoscopic view of the present disclosure.

DESCRIPTION OF REFERENCE NUMERALS 1. upper shell; 2. lower shell; 3. rotating disk; 301. internal teeth; 4. connecting rod; 5. rotating rod; 6. rod head; 7. first cover cloth; 8. second cover cloth; 9. driving component; 901. motor; 902. first transmission belt; 903. second transmission belt; 904. first belt pulley; 905. second belt pulley; 906. third belt pulley; 907. fourth belt pulley; 10. suction cup; 11. rotating head; 12. first gear; 13. second gear; 14. third gear; 15. battery; 16. control circuit board; 17. pin; and 18. fishing rod component.

DETAILED DESCRIPTION

In order to make objectives, technical solutions and advantages of the present disclosure clearer, the technical solution of the present disclosure will be described in detail below. Apparently, the described embodiments are merely a part of embodiments of the present disclosure and are not all the embodiments. On the basis of the embodiments in the present disclosure, all other implementations obtained by a person of ordinary skill in the art without creative efforts fall into the scope of protection of the present disclosure.

Referring to FIG. 1 to FIG. 10, the present disclosure provides a cat toy, including an upper shell 1 and a lower shell 2, where a rotating disk 3 is arranged between the upper shell 1 and the lower shell 2, and the edge of the rotating disk 3 is connected with a rotating rod 5. A suction cup 10 is connected below the lower shell 2, and the lower shell 2 can be firmly sucked to the floor by the suction cup 10 and prevented from being dragged away. The suction cup 10 may be a dropper suction cup.

A first cover cloth 7 is arranged between the suction cup 10 and the lower shell 2. A rotating head 11 is connected above the upper shell 1, and a second cover cloth 8 is arranged between the rotating head 11 and the upper shell 1. The cover cloths are designed in double layers, and the rotating rod 5 can smooth out folded cover cloths when rotating. The upper and lower double cover cloths are fixed together to prevent the cover cloths from falling off.

A first 8.1, a second 8.2, a third 8.3, and a fourth 8.4 connecting parts are arranged at the edges of the first cover cloth 7 and the second cover cloth 8, wherein the connecting parts are where the first cover cloth 7 and the second cover cloth 8 sewn together. The rotating rod 5 extends between the first cover cloth 7 and the second cover cloth 8. A driving component 9 for driving the rotating disk 3 to rotate is arranged in a space formed by the upper shell 1 and the lower shell 2 being connected. By driving the rotating rod 5 to rotate via the driving component 9, the decorative object connected to the rod head 6 can rotate, and the rotating rod 5 can smooth out the cover cloths.

In some implementations, referring to FIG. 1, a plurality of notches 7.5 are formed on the surface of the first cover cloth 7, and the end of the rotating rod 5 is connected with a decorative object. After power-on, the rotating rod 5 rotates 360 degrees irregularly, and the rotating rod 5 can drive the decorative object to rotate and continuously appear at the plurality of notches in the first cover cloth 7, achieving the effect of entertaining cats.

Figure 3:
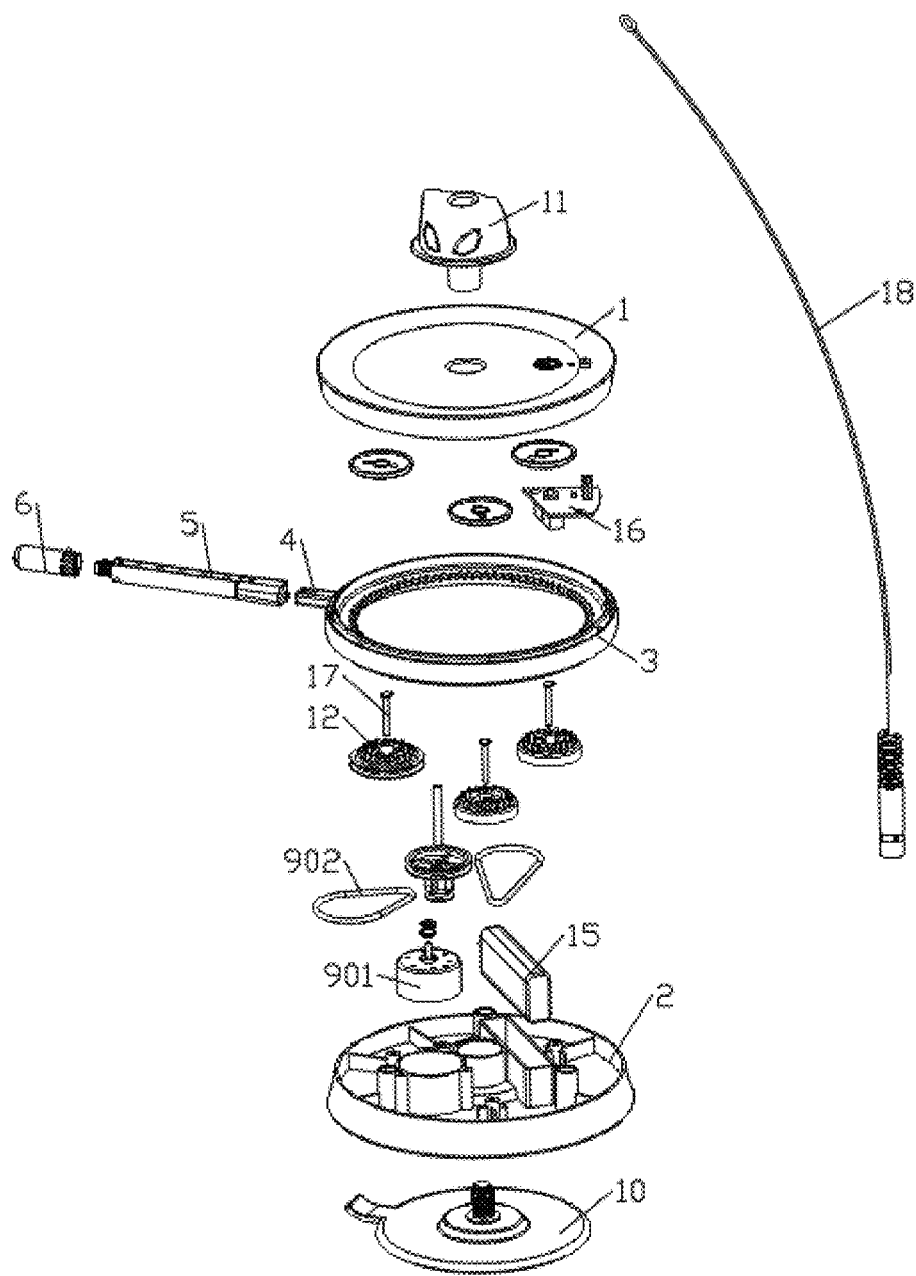
FIG. 3 is a bottom exploded view of the present disclosure.
Figure 4:
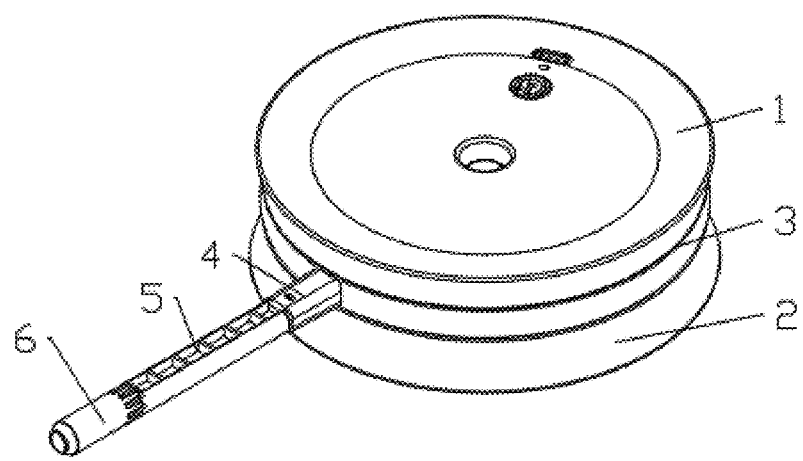
FIG. 4 is a stereoscopic view of a main body part of the present disclosure.

In some implementations, referring to FIG. 3 and FIG. 4, a connecting rod 4 is arranged at the edge of the rotating disk 3, and the rotating rod 5 is clamped with the connecting rod 4. The end of the rotating rod 5 is detachably connected with a rod head 6. The rod head 6 is in detachable threaded connection with the rotating rod 5. The head of the rotating rod 5 is in threaded connection with the rotating rod 5, and the rod head 6 is connected with the decorative object. When the decorative object is damaged, the decorative object can be replaced directly without replacing the entire rod.

Figure 5:
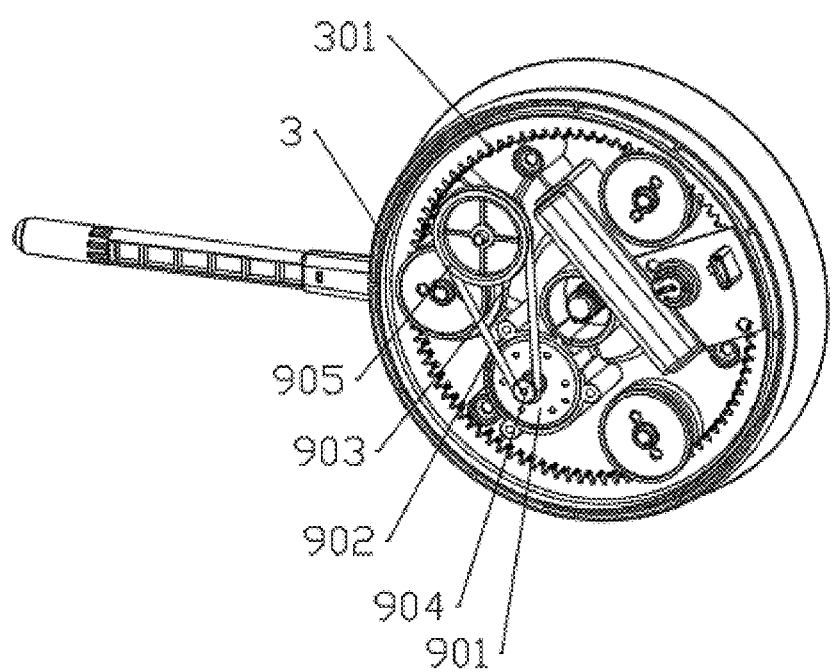
FIG. 5 is an internal structural view of the main body part of the present disclosure.
Figure 6:
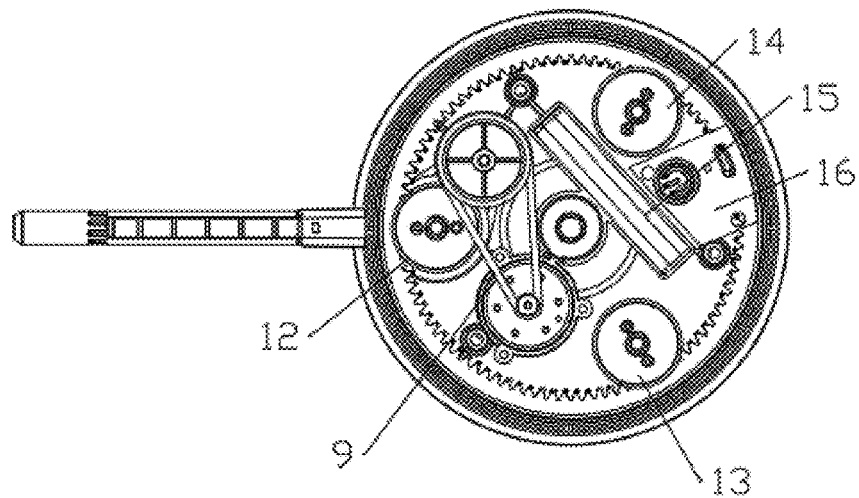
FIG. 6 is a top internal structural view of the main body part of the present disclosure.
Figure 7:
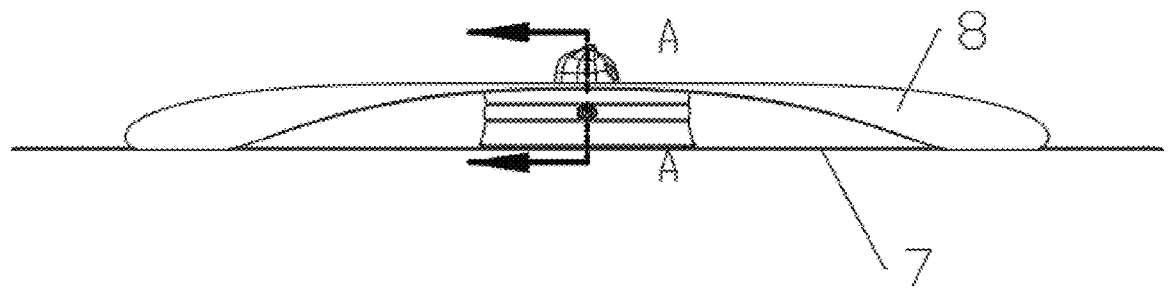
FIG. 7 is a front view of the main body of the present disclosure.
Figure 8:
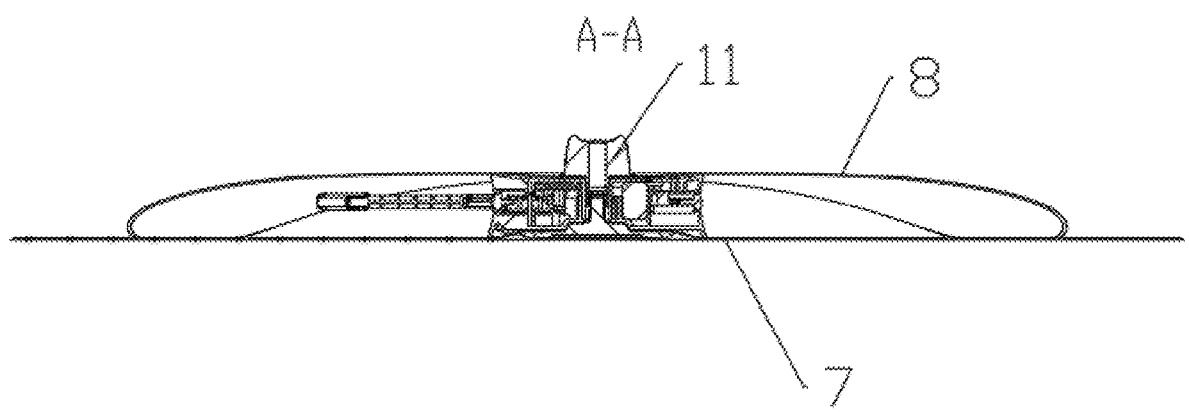
FIG. 8 is a cross-sectional view taken along line A-A of FIG. 7.

In some implementations, referring to FIG. 5 and FIG. 6, the driving component 9 includes a motor 901, the motor 901 drives a first gear 12 via a transmission mechanism, internal teeth are formed on the inner wall of the rotating disk 3, and the first gear 12 meshes with the internal teeth 301. A second gear 13 and a third gear 14 meshing with the internal teeth 301 are also arranged along the inner wall of the rotating disk 3, and the first gear 12, the second gear 13 and the third gear 14 are uniformly distributed along the internal teeth 301 of the rotating disk 3. The first gear 12, the second gear 13, and the third gear 14 are arranged along the inner wall of the rotating disk 3, and the gears are uniformly distributed along the circumference of the rotating disk 3. By using the plurality of gears to mesh with and support the internal teeth 301, friction is greatly reduced, so that the rotating disk 3 is stable and smooth in operation, and noise is reduced.

Figure 10:
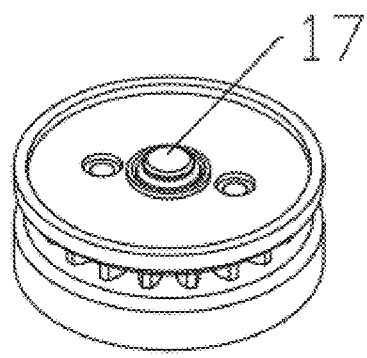
FIG. 10 is a schematic structural view of gears of the present disclosure.

In some implementations, referring to FIG. 10, the first gear 12, the second gear 13 and the third gear 14 all use capped pins 17 as shafts and are connected with the lower shell 2. The above structure can reduce errors in assembling the gears, prevent the gears from being stuck, and make assembly easier.

Figure 9:
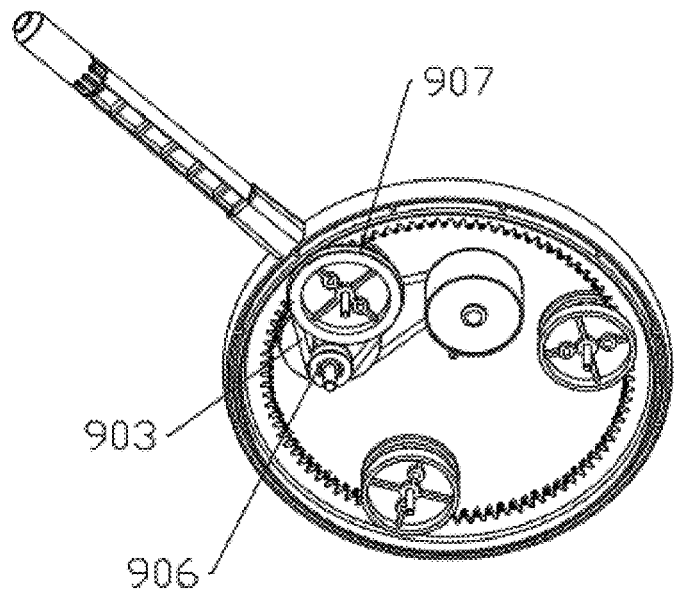
FIG. 9 is a schematic structural view of a driving mechanism of the present disclosure.

In some implementations, referring to FIG. 9, the transmission mechanism includes a first belt pulley 904, a second belt pulley 905, a third belt pulley 906 and a fourth belt pulley 907. The first belt pulley 904 is connected with the second belt pulley 905 via a first transmission belt 902, and the third belt pulley 906 is connected with the fourth belt pulley 907 via a second transmission belt 903. The third belt pulley 906 is arranged below the second belt pulley 905 and integrally formed with the second belt pulley 905, and the fourth belt pulley 907 is arranged below the first gear 12 and integrally formed with the first gear 12. The diameter of the first belt pulley 904 is smaller than that of the second belt pulley 905, and the diameter of the third belt pulley 906 is smaller than those of the second belt pulley 905 and the fourth belt pulley 907. In the above structure, the first belt pulley 904 is connected with an output shaft of the motor 901, and the motor 901 drives the first belt pulley 904. The first belt pulley 904 is connected with the second belt pulley 905 for transmission via the first transmission belt 902, and the second belt pulley 905 is integrally formed with the third belt pulley 906. The third belt pulley 906 is connected with the fourth belt pulley 907 for transmission via the second transmission belt 903, thereby driving the first gear 12 to rotate. By multi-stage belt pulley drive, the torque of the motor 901 is amplified, and the operation is smooth with low vibration and noise.

In some implementations, a fishing rod component 18 is connected above the rotating head 11. An elastic steel wire fishing rod is additionally arranged at the top of the upper shell 1, and can be hung with various accessories such as a simulation bird, feathers and ribbons. The steel wire rod can sway and swing when the toy body vibrates. The fishing rod component 18 is in detachable threaded connection with the rotating head 11. A connecting rod of the suction cup 10 penetrates through the lower shell 2 and the upper shell 1 and is in threaded connection with the rotating head 11.

A battery 15 and a control circuit board 16 are also arranged in the space formed by the upper shell 1 and the lower shell 2 being connected, and the control circuit board 16 is electrically connected with the motor 901. The motor 901 is supplied with power and controlled via the battery 15 and the control circuit board 16.

The above is merely the specific implementations of the present disclosure and is not intended to limit the scope of protection of the present disclosure. Any variations or replacements apparent to a person skilled in the art within the technical scope provided by the present disclosure shall fall within the scope of protection of the present disclosure. Therefore, the scope of protection of the present disclosure shall be subject to the scope of protection of the claims.

What is claimed is:

1. A cat toy, comprising an upper shell and a lower shell, wherein a rotating disk is arranged between the upper shell and the lower shell, and the edge of the rotating disk is connected with a rotating rod;
    a suction cup is connected below the lower shell, and a first cover cloth is arranged between the suction cup and the lower shell;
    a rotating head is connected above the upper shell, and a second cover cloth is arranged between the rotating head and the upper shell;
    a first, a second, a third, and a fourth connecting parts are arranged at the edges of the first cover cloth and the second cover cloth, wherein the connecting parts are where the first cover cloth and the second cover cloth sewn together, and the rotating rod extends between the first cover cloth and the second cover cloth; and
    a driving component for driving the rotating disk to rotate is arranged in a space formed by the upper shell and the lower shell being connected.

2. The cat toy according to claim 1, wherein a plurality of notches are formed on the surface of the first cover cloth, the end of the rotating rod is connected with a decorative object, and when the rotating rod rotates, the rotating rod drives the decorative object to rotate and continuously appear at the plurality of notches in the first cover cloth.

3. The cat toy according to claim 1, wherein a connecting rod is arranged at the edge of the rotating disk, and the rotating rod is clamped with the connecting rod.

4. The cat toy according to claim 3, wherein the end of the rotating rod is detachably connected with a rod head.

5. The cat toy according to claim 4, wherein the rod head is in detachable threaded connection with the rotating rod.

6. The cat toy according to claim 1, wherein the driving component comprises a motor, the motor drives a first gear via a transmission mechanism, internal teeth are formed on the inner wall of the rotating disk, and the first gear meshes with the internal teeth.

7. The cat toy according to claim 6, wherein the transmission mechanism comprises a first belt pulley, a second belt pulley, a third belt pulley and a fourth belt pulley, the first belt pulley is connected with the second belt pulley via a first transmission belt, and the third belt pulley is connected with the fourth belt pulley via a second transmission belt; and
    the third belt pulley is arranged below the second belt pulley and integrally formed with the second belt pulley, and the fourth belt pulley is arranged below the first gear and integrally formed with the first gear.

8. The cat toy according to claim 7, wherein the diameter of the first belt pulley is smaller than that of the second belt pulley, and the diameter of the third belt pulley is smaller than those of the second belt pulley and the fourth belt pulley.

9. The cat toy according to claim 1, wherein a fishing rod component is connected above the rotating head.

10. The cat toy according to claim 9, wherein the fishing rod component is in threaded connection with the rotating head.

11. The cat toy according to claim 1, wherein a connecting rod of the suction cup penetrates through the lower shell and the upper shell and is in threaded connection with the rotating head.

12. The cat toy according to claim 6, wherein a battery and a control circuit board are also arranged in the space formed by the upper shell and the lower shell being connected, and the control circuit board is electrically connected with the motor.

13. The cat toy according to claim 6, wherein a second gear and a third gear meshing with the internal teeth are also arranged along the inner wall of the rotating disk, and the first gear, the second gear and the third gear are uniformly distributed along the internal teeth of the rotating disk.

14. The cat toy according to claim 13, wherein the first gear, the second gear and the third gear all use capped pins as shafts and are connected with the lower shell.

15. The cat toy according to claim 13, wherein the first gear, the second gear, and the third gear are arranged along the inner wall of the rotating disk, and the gears are uniformly distributed along the circumference of the rotating disk.

* * * * *